(12) United States Patent
Rosasco

(10) Patent No.: US 6,317,137 B1
(45) Date of Patent: Nov. 13, 2001

(54) MULTI-THREADED TEXTURE MODULATION FOR AXIS-ALIGNED VOLUME RENDERING

(75) Inventor: John D. Rosasco, Belmont, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/201,814

(22) Filed: Dec. 1, 1998

(51) Int. Cl.$^7$ .................................................. G06T 11/40

(52) U.S. Cl. .......................... 345/582; 345/467; 345/471; 345/472

(58) Field of Search .................................... 345/430, 424, 345/423, 419, 429, 505, 425, 439, 472, 471, 467, 25, 470, 128; 600/461, 407; 382/128, 203, 217

(56) References Cited

U.S. PATENT DOCUMENTS

| | | | |
|---|---|---|---|
| 5,570,460 | * 10/1996 | Ramanujam | 345/424 |
| 5,786,826 | * 7/1998 | Kwok | 345/505 |
| 5,797,849 | * 8/1998 | Vesely et al. | 600/461 |
| 5,831,623 | * 11/1998 | Negishi et al. | 345/424 |
| 5,891,030 | * 4/1999 | Johnson et al. | 600/407 |
| 5,926,568 | * 7/1999 | Chaney et al. | 382/217 |

OTHER PUBLICATIONS

Cabral, B. et al., "Accelerated Volume Rendering and Tomographic Reconstruction Using Texture Mapping Hardware," *Proc. Of ACM/IEEE Symp. On Volume Visulaization*, 1994, pp. 91–98.

Drebin, R.A. et al., "Volume Rendering," *Computer Graphics*, vol. 22, No. 4, Aug. 1988, pp. 65–74.

Foley, J.D., *Computer Graphics Principles and Practice—2nd Edition in C*, Copyright 1996, Addison–Wesley Publishing Company, pp. xvi–xxiii, 855–922 and 1034–1039.

Watt, A. and Watt, M., *Advanced Animation and Rendering Techniques: Theory and Practice*, Copyright 1992, ACM Press, pp. xi–xiv and 297–321.

\* cited by examiner

*Primary Examiner*—Matthew Luu
*Assistant Examiner*—Thu-Thao Havan
(74) *Attorney, Agent, or Firm*—Sterne, Kessler, Goldstein & Fox, p.l.l.c.

(57) ABSTRACT

A method, system, and computer program product are provided for multi-threaded texture modulation in axis-aligned volume rendering. Three texture modulation threads are used to modulate texture of three sets of the volumetric data (image sets) in accordance with a texture modulation request. Control is returned from the first texture modulation thread to a main rendering thread while the first texture modulation thread is executing. A user can then interact with a display view while the first texture modulation thread is executing. An intermediate display view of a texture modulated set of volumetric data can be rendered. In one example, a plurality of display connections and contexts are opened for the main rendering thread and each texture modulation thread respectively. Sets of pixel buffers and look-up tables are provided for the respective texture modulation threads. A texture object is included in a context of the main rendering thread. Each pixel buffer stores a respective image set and is associated with the texture object. According to further feature, the sets of volumetric data are sorted based on the angle between normals to the sets and a current viewpoint. The texture modulation threads are then executed (unblocked) based on the sorted order of the sets. For a given graphics machine and especially on a low end machine, the multi-threaded texture modulation of the present invention increases speed, provides interactive control, and gives intermediate display views in axis-aligned volume rendering. A clinician or other user can see intermediate information and interact with the intermediate display view accordingly.

16 Claims, 13 Drawing Sheets

(1 of 13 Drawing Sheet(s) Filed in Color)

MAIN MEMORY (UNIFIED CASE)

EXAMPLE OF VOLUME RENDERED IMAGE OF SKULL DATA SET

1192

MULTI-THREADED TEXTURE MODULATION FOR AXIS-ALIGNED VOLUME RENDERING

BACKGROUND OF THE INVENTION

1. Field of the Invention

The present invention relates to computer data processing and graphics, and in particular, to computational tasks including, but not limited to, volume rendering and image processing operations.

2. Related Art

Volumetric data representing spatial volumes arises in many applications. Computed tomography (CT) and magnetic resonance imaging (MRI) scanners create a volume by imaging a series of cross-sections, also called slices or samples. Astrophysical, meteorological, and geophysical measurements, and business or economics data also naturally lead to a volumetric data set. Computer graphics systems use a volume rendering algorithm to display a visualization of volumetric data. See, Watt and Watt, *Advanced Animation and Rendering Techniques: Theory and Practice,* (ACM Press: New York, N.Y. 1992), Chapter 13, pages 297–321; Foley et al., *Computer Graphics,* Second Ed. In C, Addison-Wesley Publishers, U.S.A. (1996), pp. 1034–39; R. Drebin, L. Carpenter, and P. Hanrahan, "Volume Rendering," *Computer Graphics,* Vol. 22, No. 4, (SIGGRAPH '88, Atlanta, Ga.), August 1988, pp. 65–74; and B. Cabral, N. Cam and J. Foran, "Accelerated Volume Rendering and Tomographic Reconstruction Using Texture Mapping Hardware," *Proceedings of ACM/IEEE Symposium on Volume Visualization* (IEEE CS Press), pp. 91–98, 1994 (Order No. PR07067, 1995) (each of which is incorporated in its entirety herein by reference).

In axis-aligned volume rendering, volumetric data is represented by three sets of two-dimensional textures or images. Each set typically corresponds to a cardinal view (i.e., a view along an x, y, or z direction). To render a volume image an axis-aligned volume rendering (VR) algorithm volume renders each set of data relative to a current viewpoint. Typically, an axis-aligned VR algorithm begins with the set most nearly perpendicular to a view from eye point. Blending and accumulation operations are performed on samples along the selected axis to obtain a final frame buffer image. The frame buffer image is then output for display. See, e.g., the Volume Imaging application programming interface (also called OPENGL VOLUMIZER) released by Silicon Graphics, Inc.

Clinicians and other users want to modulate texture to accentuate different features in the volumetric data. For example, a radiologist observing a volume rendered display view of a human head may want to analyze only soft tissue. Such texture modulation, however, is difficult to perform in real-time on most graphics platforms. Indeed, on low-end graphics machines (platforms without three-dimensional (3-D) texturing), texture modulation is the single biggest performance limiting factor. Performance is further limited in the case of axis-aligned volume rendering as three copies of the volume data (that is, all three orthogonal sets of 2-D textures)need to be modulated.

These performance limitations slow texture modulation. In axis-aligned volume rendering, a user must wait until texture is modulated in each copy of the volume data. In addition, control is also lost during this time of texture modulation. In other words, a user cannot interact with the current volume rendered image until the texture modulation of all three copies of the volume data and the volume rendering of the current view based on a copy of the modulated volume data is complete.

As recognized by the inventor, what is needed is a technique which allows faster texture modulation in axis-aligned volume rendering even on lower end graphics platforms. Control needs to be returned to a user during texture modulation processing. A user needs to be able to interact with a volume rendered image after a texture modulation request is made, that is, while texture modulation processing is being performed. A user needs to be able to see an intermediate texture modulated view, that is, a view which is rendered and displayed while texture modulation is proceeding.

SUMMARY OF THE INVENTION

A method, system, and computer program product provide multi-threaded texture modulation in axis-aligned volume rendering. Three sets of volumetric data are provided. Each set corresponds to a different view.

In one embodiment, when a texture modulation request is made an image set (also called a copy of the volumetric data) is selected. Image sets are sorted based on an angle between the respective image set planes and a current viewpoint. The image set which is selected first is determined to be the most orthogonal to a current viewpoint. For example, an x-y image set is selected for current viewpoints closest to a surface normal from the x-y plane (that is, points closest to the z axis). Alternatively, a y-z image set is selected first for current viewpoints points closest to the x axis. A x-z image set is selected first for current viewpoints closest to the y axis. In this way, the first image set which is to be texture-modulated is the image set that is likely to provide the most helpful and informative display view (with the most relevant foreground or front surface information).

This sorting then identifies the order in which the copies of the volumetric data will be modulated. More specifically, this sorting identifies the order in which three threads will be executed to modulate texture in their respective image sets (i.e., the respective copies of the volumetric data). Depending upon the results of the sorting operation then different threads will be executed first, second and third.

After sorting, a main rendering thread and a first texture modulation thread are executed. The first texture modulation thread is simply the thread that corresponds to the selected image set. The first texture modulation thread executes to modulate texture of a first set of the volumetric data in accordance with a texture modulation request.

Control returns from the first texture modulation thread to the main rendering thread while the first texture modulation thread is executing. In this way, a user can interact with a display view while the first texture modulation thread runs. Second and third texture modulation threads also execute to modulate texture of second and third sets of the volumetric data in accordance with the texture modulation request.

Such multi-threaded processing, according to the present invention, de-couples rendering and texture modulation operations and leverages processing in multiple threads. The time to satisfy an input texture modulation request is reduced to one-third the time required in conventional axis-aligned volume rendering.

When the first texture modulation thread completes, a final texture modulated view can be rendered. The rendering has the final texture modulated result for the current view. A final display view representative of the input texture modulation request is drawn based on a copy of a set of texture modulated volumetric data. Preferably, the set of texture modulated volumetric data used corresponds to the current view, that is, the set having a cardinal axis most parallel with a line of sight from an eyepoint of the current view.

According to a further feature of the present invention, an intermediate texture modulated view can be displayed before modulation of an image set is complete, that is, while the first texture modulation thread is executing. This is possible because the main rendering thread and texture modulation threads are de-coupled from each other. In an intermediate texture modulated display view, a user sees immediate feedback on the changes in the image wrought by the input texture modulation request. Such feedback is visually compelling and informative. A user remains engaged. A user can gauge the effect of the texture modulation even before the view is complete. For instance, by observing the intermediate texture modulated view, a user can without delay plan the next texture modulation request he or she wants to study or can move to another viewpoint while the first texture modulation thread continues to execute.

Thread semaphores are used to block and unblock the texture modulation threads. In one example, the texture modulation threads are executed (unblocked) based on a sorted order of the sets or a predetermined or default order. In one feature of the present invention, the sets of volumetric data are sorted based on the angle between normals to the sets (that is, the cardinal axes) and a current viewpoint. Sets more closely parallel with the line sight are given priority in the sorting.

In one example client/server implementation, a further feature is provided in that a plurality of display connections and contexts are used. For example, a display connection can be a socket-based VI event connection between a host X.11 server and a client application. In this case, a client application is the multi-threaded axis-aligned volume renderer. A display connection and graphics state context is opened for the main rendering thread and each texture modulation thread respectively. Sets of pixel buffers (also called off-screen buffers) and look-up tables are provided for the respective texture modulation threads. A texture object is included in a context of the main rendering thread. Each pixel buffer stores a respective image set and is associated with the texture object.

One or more processors can be used to perform the work of the main rendering thread or the texture modulation threads. In one example, four processors are dedicated to each thread.

In one example implementation compatible with an IRIX machine, a display connection and context are opened in initiating each texture modulation thread. Each texture modulation thread is initiated by creating a respective pixel buffer and look-up table, storing a respective image set in the pixel buffer, and associating the pixel buffer with a texture object in a context of the main rendering thread. Each texture modulation thread then executes (in series or in parallel depending upon the number of processors available on a machine) to update a respective look-up table and to modulate original data (texture) based on the respective updated look-up table. Entries in the updated look-up tables represent the texture modulation request. Modulated volumetric data is stored in respective pixel buffers.

For example, when a first texture modulation thread is executed the following steps are performed. A respective first look-up table is updated in accordance with the texture modulation request. A first image set of original volumetric data is modulated based upon the update first look-up table. Modulated volumetric data is stored in a first pixel buffer. The contents of the first pixel buffer can be reformatted (i.e., texture mapped) to a frame buffer for display at any time during modulation. Thus, the main rendering thread can output an intermediate texture modulated display view for display that represents the current first pixel buffer contents at any time during modulation, that is, as the first texture modulation thread progresses. A final texture modulated display view is rendered when the first texture modulation thread completes. Second and third texture modulation threads execute similar steps to update respective look-up table entries and to store modulated data into respective pixel buffers based on the input texture modulation request.

In practice, the frame buffer is periodically updated with the contents of the pixel buffer. The rate at which the frame buffer is updated can be dependent upon the duration of texture modulation processing. For example, a frame buffer can be updated every 100 milliseconds for relatively quick texture modulation threads that complete in one or two seconds. Slower frame buffer update rates can be used for longer texture modulation requests, such as, oil and gas data samples where modulation requests can take considerably longer.

In one example implementation, processing logic (software and/or hardware) switches control of at least one processor from executing a first texture modulation thread to executing the main rendering thread while the first texture modulation thread is executing. Graphics hardware is used to update look-up table entries to represent a texture modulation request. Based on the updated look-up table, original data (texture) for an image set is modulated to obtain intermediate results. The graphics hardware then reformats (e.g., texture maps) the intermediate results to a frame buffer for display. In this way, dedicated hardware for look-ups can be avoided. Such hardware is expensive because a lot of die space is required on a chip.

The present invention is described primarily with respect to an example volume rendering and texture modulation embodiment. As would be apparent to a person skilled in the art given this description, of multi-threaded operations the present invention can be used in other computational tasks including, but not limited to, image processing.

Multi-threaded, uni-processor and multi-processor graphics platforms have become increasingly popular as their cost decreases and their applications widen. The present invention allows faster texture modulation in axis-aligned volume rendering even on lower end graphics platforms. Three texture modulation threads can operate de-coupled from a main rendering thread to increase performance by a factor of three. In other words, frame rate is increased by a factor of three. Response time is reduced to one-third.

Control is returned to a user (i.e. to a main rendering thread) during texture modulation processing. In this way, a user can interact with a volume rendered image after a texture modulation request is made while the multi-threaded texture modulation processing is being performed. Further, intermediate display views are shown as a texture modulation thread progresses. Consequently, a clinician or other user can see intermediate information and interact with the intermediate display view accordingly.

These are significant and practical advantages to an end user. For a given graphics machine and especially on a low end machine, the multi-threaded texture modulation of the present invention increases speed, provides interactive control, and gives intermediate display views in axis-aligned volume rendering.

Further features and advantages of the present invention, as well as the structure and operation of various embodiments of the present invention, are described in detail below with reference to the accompanying drawings.

BRIEF DESCRIPTION OF THE FIGURES

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

Figure 1:
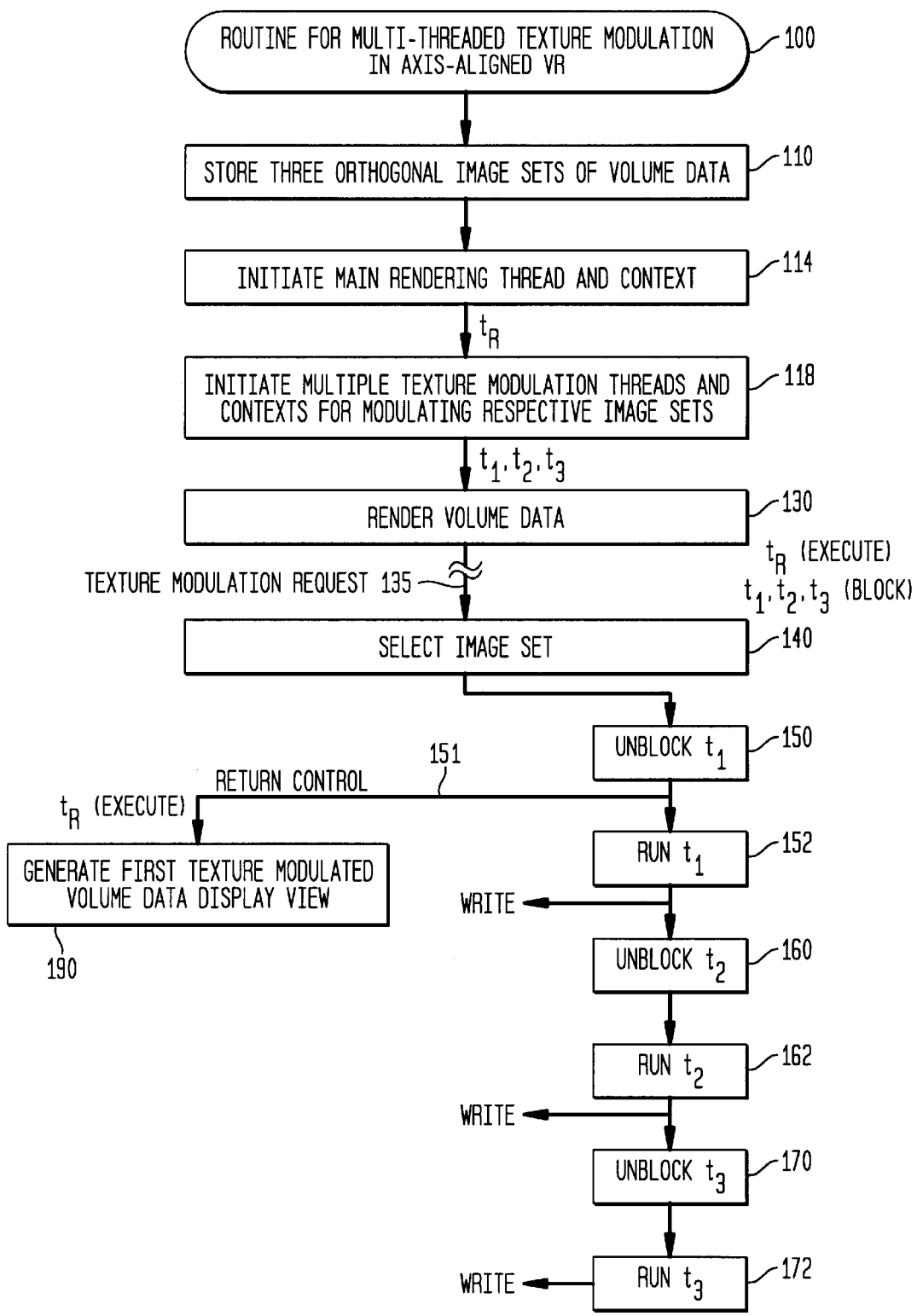
FIG. 1 is a diagram of a routine for multi-threaded texture modulation in axis-aligned volume rendering according to one embodiment of the present invention.

The present invention is described with reference to the accompanying drawings. An effort is made to adhere to the following convention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

The present invention relates to multi-threaded texture modulation in axis-aligned volume rendering. One embodiment of the present invention will be described with respect to routine 100 in FIG. 1. In describing routine 100, reference will be made to example display views in FIGS. 10 and 11. Next, an example implementation of routine 100 will be described with respect to FIGS. 2A–2F and 3–9.

Terminology

"Volumetric data" as used herein refers to any digital data that can be expressed as a three-dimensional or spatial volume. Such digital data can include, but is not limited to, three-dimensional arrays or a set of one or two dimensional arrays. For example, three-dimensional arrays can represent scientific and business data. Two-dimensional arrays or slices are found in computer tomography, magnetic resonance imaging, ultrasound video images, and other medical imaging applications. A set or sequence of sampled 2-D images can be used as volumetric data. Volumetric data can be one channel or multi-channel data. These examples are illustrative. The present invention is not so limited, and in general, can be used with any application of volumetric data.

"Voxel" or "voxel value" are used interchangeably to refer to a point in volumetric data. The voxel is represented by a location in three-dimensional space (e.g., Cartesian coordinates (x,y,z)) and one or more channel values or components (e.g., four-channel data can have red, green, blue, and alpha components). "Volume renderer" refers to any type of volume-rendering algorithm or system including, but not limited to, an axis-aligned volume renderer. "Intermediate texture modulated view" refers to a view which is rendered and displayed while texture modulation is proceeding according to the present invention.

Multi-Threaded Texture Modulation

FIG. 1 shows a routine 100 for multi-threaded texture modulation in axis-aligned volume rendering according to an embodiment of the present invention. Three orthogonal image sets of volume data are stored in memory (step 110). This storage operation can be performed during a pre-processing stage or on-the-fly. A main rendering thread ($t_R$) and associated context or state information is initiated (step 114). According to the present invention, multiple texture modulation threads ($t_1$, $t_2$, $t_3$) and associated contexts or states for modulating the respective image sets are initiated (step 118).

Figure 10:
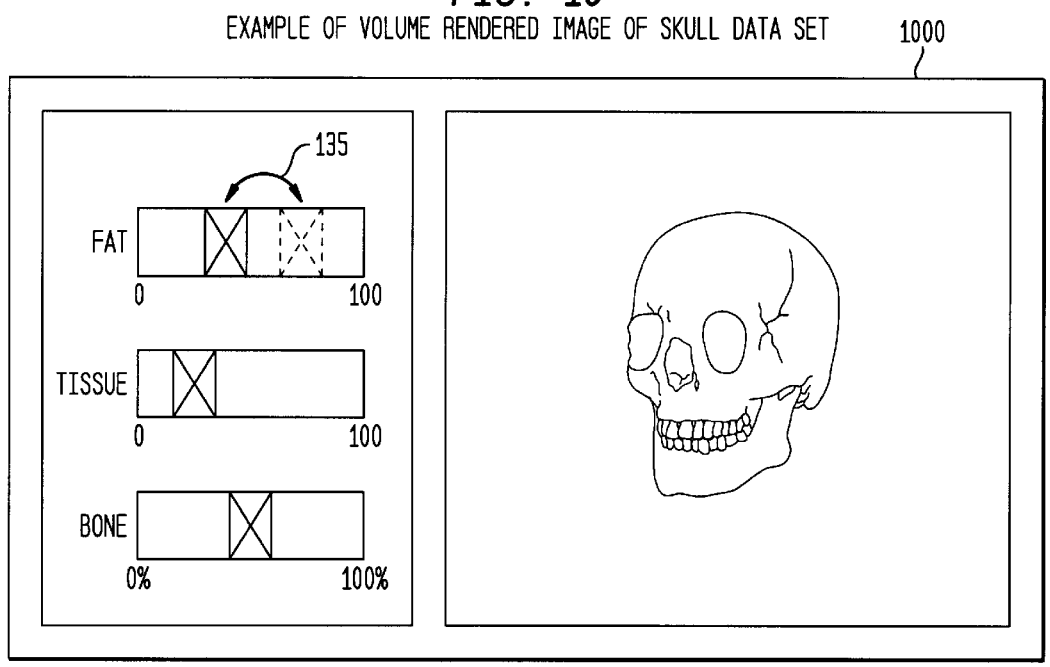
FIG. 10 is an example display view of a volume-rendered image of a human head data set according to the present invention.

In step 130, the main rendering thread $t_R$ executes an axis-aligned volume-rendering algorithm to render volume data. Texture modulation threads $t_1$, $t_2$, $t_3$ are blocked. For example, as shown in FIG. 10, a display view 1000 of a human head may be drawn from a human head volume data set. Different features in the volume data are represented by different texture values. To accentuate or diminish features which are displayed, a clinician or user inputs a texture modulation request 135 into a graphical user-interface. For example, in FIG. 10, fat, tissue, and bone information may be highlighted by controlling the respective fat, tissue and bone sliders in the display view 1000. For example, FIG. 10 shows a user moving the fat slider to a new fat value to input a texture modulation request 135.

Once an input texture modulation request 135 is made, an image set is selected (step 140). For example, an image set corresponding to the texture modulation thread $t_1$ may be selected. Texture modulation $t_1$ is then unblocked to enable it to run (step 150). Control immediately returns to the main rendering thread $t_R$ (step 151).

Figure 11:
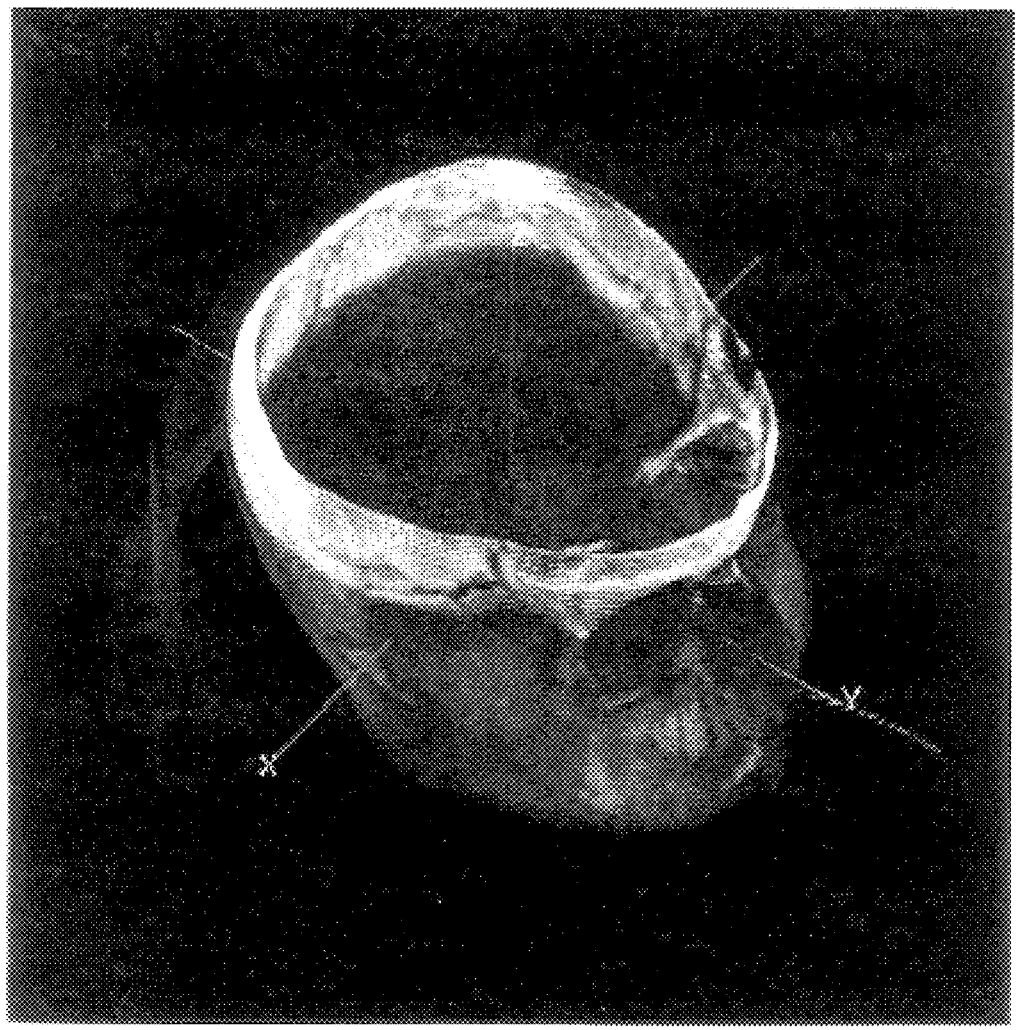
FIG. 11 is an example color image of an intermediate texture modulated view of a human head data set, according to a further feature of the present invention.

Texture modulation thread $t_1$ which has been unblocked proceeds to run (step 152). Texture modulation thread $t_1$ runs to modulate original data of a corresponding image set to represent the input texture modulation request 135. As texture modulation thread $t_1$ progresses, the main rendering thread $t_R$ reads the intermediate modulated results stored in a buffer (e.g., a pixel buffer or off-screen buffer) and generates a first intermediate or final texture modulation volume data display view (step 190). FIG. 11 shows an example first intermediate display view 1192 of the human head in FIG. 10 modulated in accordance with texture modulation request 135. In display view 1192, the image is drawn based on an intermediate modulated result in a pixel buffer, that is, one image set that has been partially modulated as thread $t_1$ progresses to represent input texture modulation request 135.

Once texture modulation thread $t_1$ completes, the main rendering thread $t_R$ generates a final texture modulation volume data display view. In a final modulated display view, the image is drawn based on a final result for a current view when thread $t_1$ ends, that is, when one image set has been completely modulated to represent input texture modulation request 135.

In step 160, the next texture modulation thread $t_2$ is unblocked. Texture modulation thread $t_2$ runs to modulate the texture of another corresponding image set to represent input texture modulation request 135 (step 162). Finally, the third texture modulation thread $t_3$ is unblocked (step 170) and begins to run (step 172). When texture modulation thread $t_3$ runs, texture is modulated in the final image set to represent input texture modulation request 135.

Only modulation by the first texture modulation thread of an image set corresponding to the current view contributes to the intermediate or final volume rendered image which is displayed. However, the other copies of image sets are modulated by the other two texture modulation threads to accelerate rendering from different viewpoints when a user manipulates the texture modulated image. Texture modulation threads $t_1$–$t_3$ are blocked and unblocked in series to reduce concurrent memory accesses by the threads. Alternatively, one or more of the texture modulation threads can be run in parallel as desired in a particular machine.

Example Implementation of Multi-Threaded Texture Modulation

Figure 3:
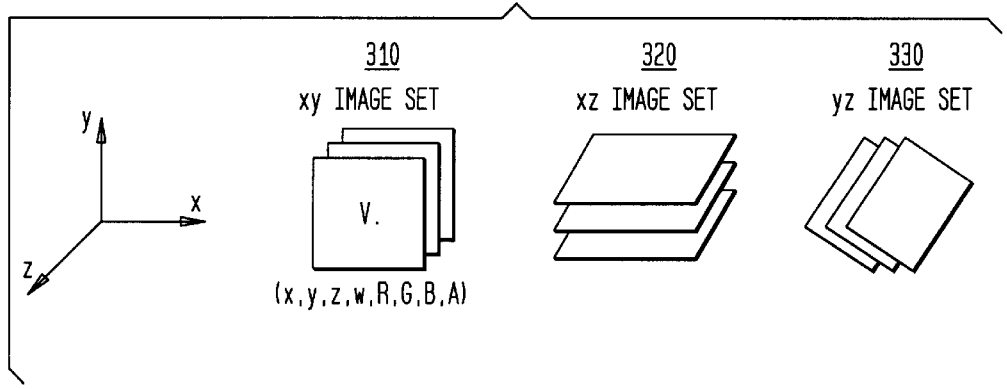
FIG. 3 is a diagram of example orthogonal image sets of volumetric data.
Figure 4:
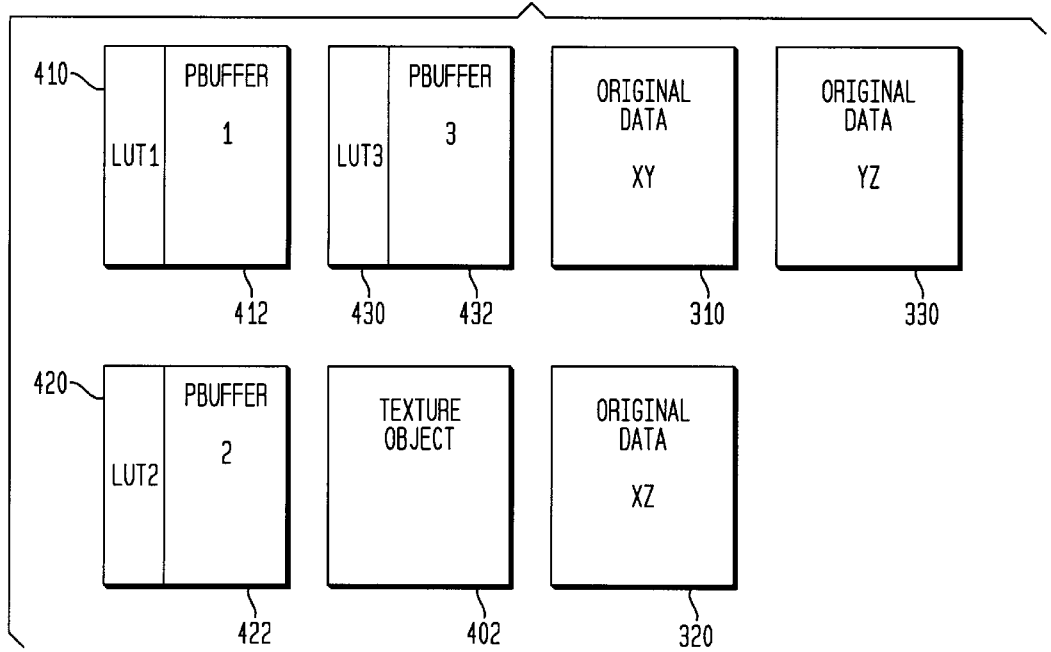
FIG. 4 is an example of main memory allocation in a unified case according to one example of the present invention.

Each of the steps 110–190 are now described in further detail with respect to an example implementation. In step 110, volume data for a single image set can be read into memory. For example, as shown in FIG. 3, in a Cartesian coordinate system this image set can by an x-y image set 310. Each voxel in the image set can include coordinates x,y,z, and optionally, a scalar w varying between 0 and 1. Texture channel information can also be included for one or more texture channels. In this example, four texture channels red, green, blue, and alpha, are used. As is well known in axis-aligned volume rendering, other orthogonal image sets can then be generated from the first stored x-y image set. Preferably, two orthogonal image sets, x-z image set 320 and y-z image set 330, are generated from x-y image set 310 and stored in a memory. In this way, three copies of the volume data are available for supporting an axis-aligned volume-rendering algorithm. As shown in FIG. 4, in the case of a unified main memory, original image sets 310–330 are stored in a main memory. Distributed or non-unified memory arrangements can also be used.

In step 114, main rendering thread $t_R$ and associated context information are initiated. In one example, a texture object 402 is allocated for supporting the main rendering thread (FIG. 4). In step 118, the multiple texture modulation threads $t_1$, $t_2$, and $t_3$ (and contexts for the respective image sets) are initiated. In initiating each multiple texture modulation thread, pixel buffers (also called off-screen buffers) and lookup tables are allocated in the main memory (FIG. 4). For example, texture modulation thread $t_1$ is associated with a lookup table 410 and pixel buffer or pbuffer 412 allocated in main memory. Texture modulation thread $t_2$ is associated with lookup table 420 and pixel or pbuffer 422 allocated in main memory. Texture modulation thread $t_3$ is associated with lookup table 430 and pixel buffer or pbuffer 432 allocated in main memory. Look-up tables 410, 420, and 430 include the same data, namely, entries for modulating single channel or multi-channel texture.

Any type of pixel buffer or off-screen buffer can be used including, but not limited to, a digital media (DM) buffer. In the case of a DM buffer, texture object 402 includes texture object identifiers (e.g., integers) which are maintained in the main application process and refer to actual texture data stored in the digital media buffer (dm buffer memory) of the modulation context drawable (digital media pixel buffer).

Figure 5:
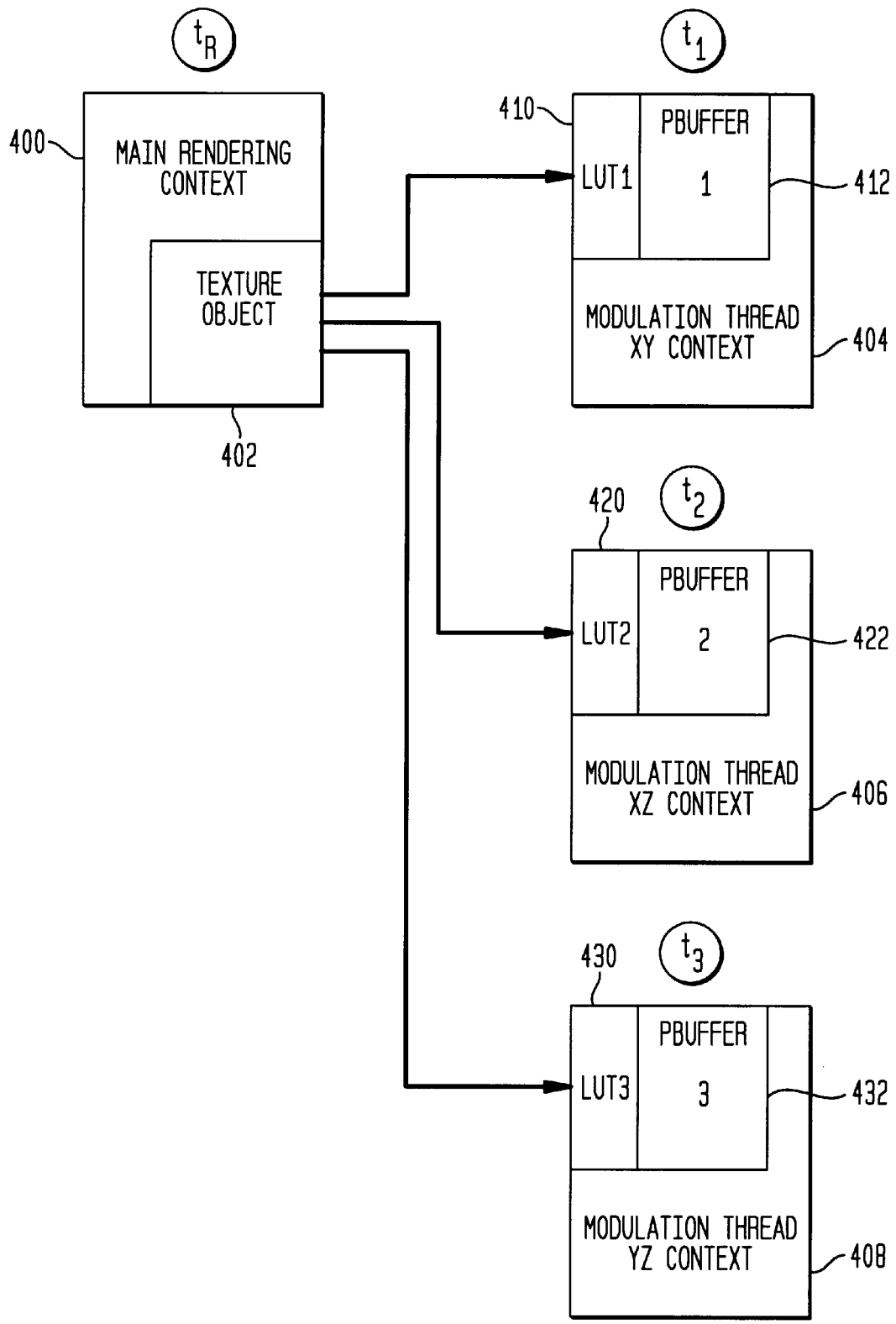
FIG. 5 is a diagram of context information relating to a main rendering thread and each texture modulation thread according to an example of the present invention.

In initiating the main rendering thread in step 114 and the texture modulation threads in step 118, texture object 402 is associated with each of the pixel buffers 410, 422, and 432, as shown in FIG. 5. Context information 400 is allocated for the main rendering thread $t_R$. As would be apparent to a person skilled in the art given this description, such context information 400 can include any state or variable information needed to maintain the operation of main rendering thread $t_R$. Similarly, context information 404 is associated with texture modulation thread $t_1$. Context information 406 is associated with texture modulation thread $t_2$. Context information 408 is associated with texture modulation thread $t_3$.

Figure 2A:
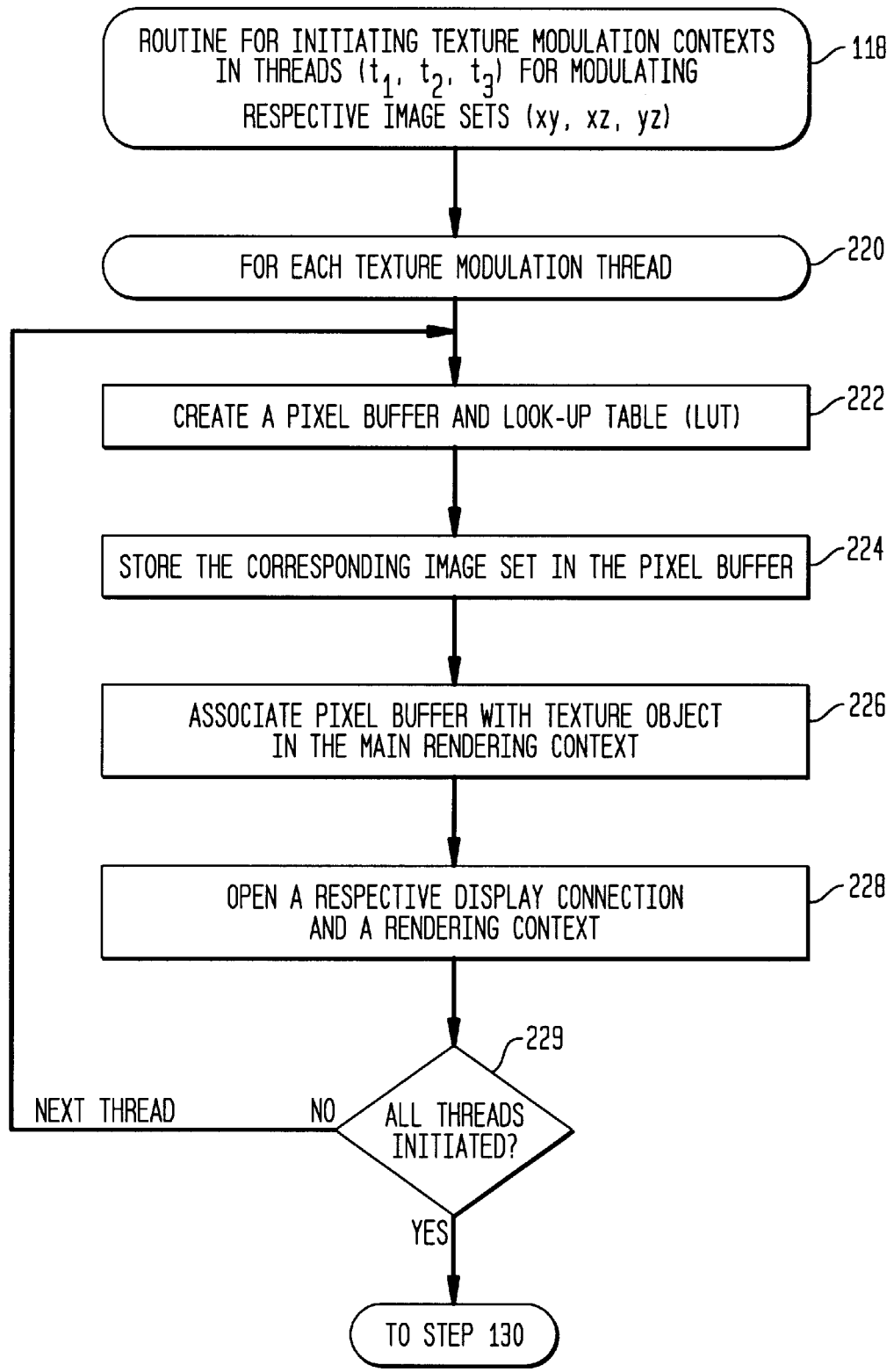
FIGS. 2A, 2B, 2C, 2D, 2E, and 2F are diagrams of an example routine implementing the routine of FIG. 1.

FIG. 2A shows an example routine for initiating texture modulation contexts according to step 118 in further detail (steps 220 to 229). A loop 220 is executed for each texture modulation thread. In step 222, a pixel buffer and lookup table is created. The corresponding image set is then stored in the pixel buffer (step 224). The pixel buffer is then associated with texture object 402 in the main rendering context 400 (step 226).

In step 228, a respective display connection and rendering context is opened. For example, for texture modulation thread $t_1$, context 404 is created and allocated. In step 229, a check is made to determine if all threads had been initiated. If all threads have not been initiated, loop 220 is repeated for the next uninitiated texture modulation thread. When all threads are initiated in step 229, step 118 is finished and control proceeds to step 130.

Figure 6:
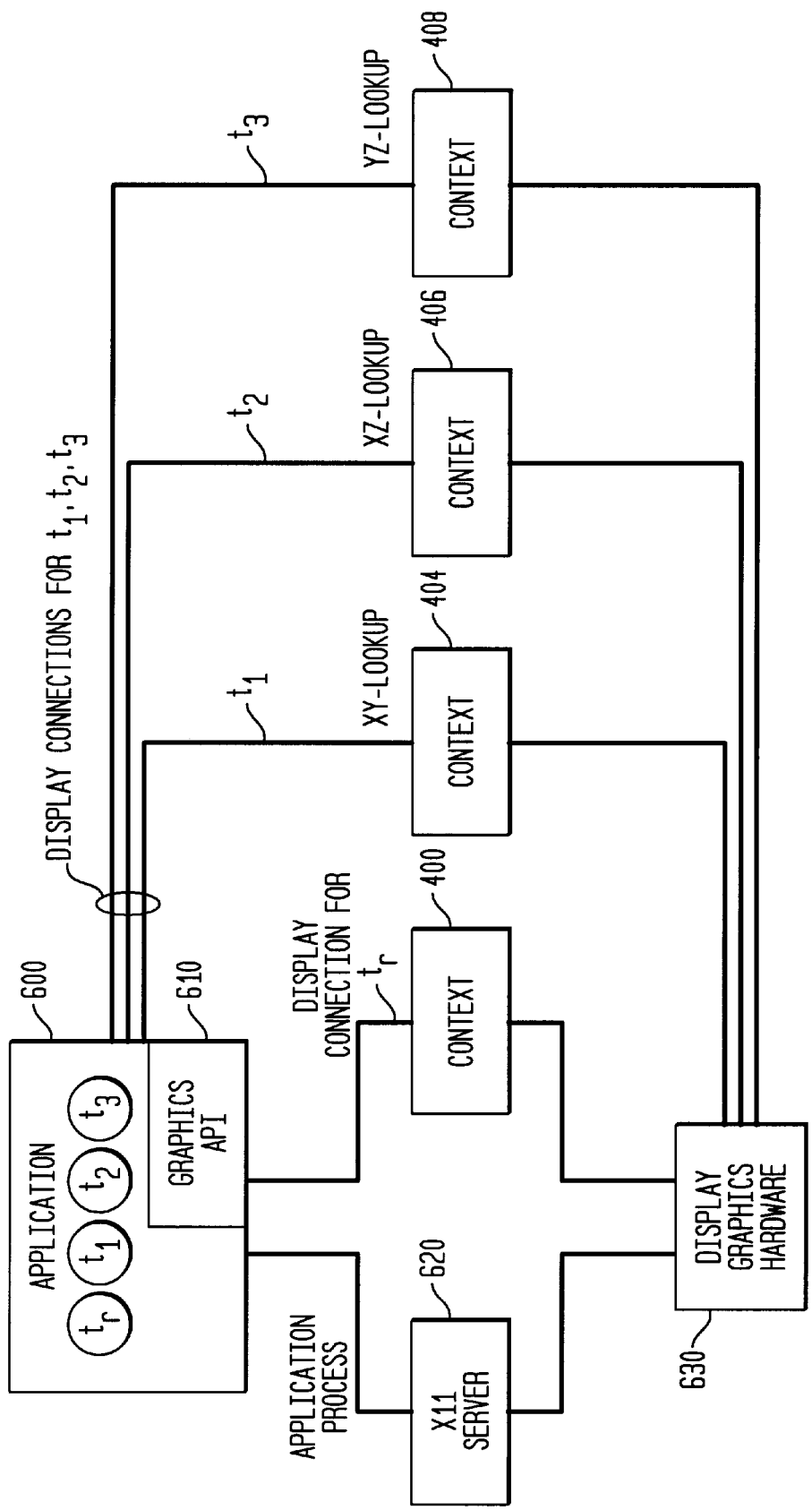
FIG. 6 is a diagram of display connections and contexts opened for the main rendering thread and each texture modulation thread in an example graphics API and server environment.

FIG. 6 shows an example of the display connections and rendering contexts which are opened in step 228 in a graphics application programming interface (API) and server environment. Application 600 can run threads $t_R$, $t_1$, $t_2$, $t_3$. Graphics API 610 can include, but is not limited to, a graphics API such as OPEN GL® by Silicon Graphics, Inc. Server 620 can be an X11 server. Server 620 can execute application 600, including each of the threads $t_R$, $t_1$, $t_2$, $t_3$. Server 620 further can process procedural calls to graphics API 610. Server 620 can interface with display graphics hardware 630 to open display connections for main rendering thread $t_R$ and each of the texture modulation threads $t_1$, $t_2$, $t_3$. Server 620 can further initiate and update context and state information for each of the associated contexts 400, 404, 406, and 408, as shown in FIG. 6.

Figure 2B:
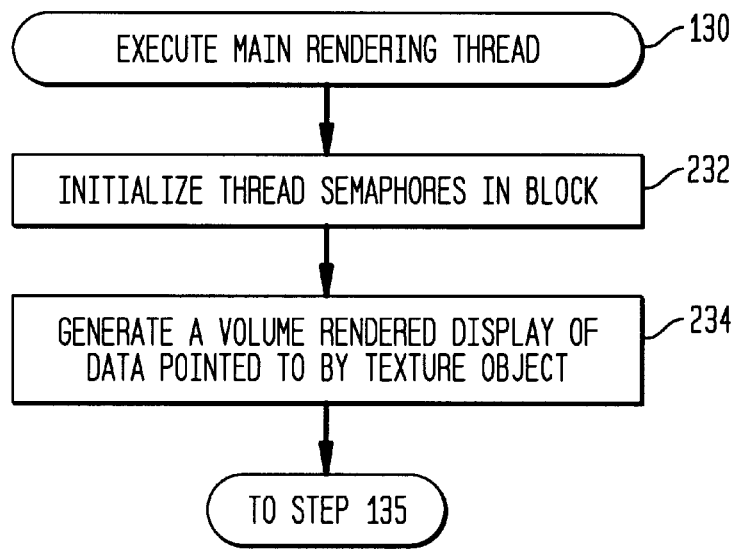

As shown in FIG. 2B, in one example implementation of step 130, thread semaphores are initialized to a block state (step 232). Next, the main rendering thread $t_R$ generates a volume-rendered display of data pointed to by texture object 402 (step 234). For example, as shown in FIG. 5, an axis-aligned volume rendering algorithm executes at the call of main rendering thread $t_R$. The axis-aligned volume rendering algorithm uses one of the copies of original volumetric data or image sets pointed to by texture object 402.

Thus, the axis aligned volume-rendering algorithm renders an image using one of the three orthogonal image sets stored in pixel buffers 412, 422, and 432.

Figure 2C:
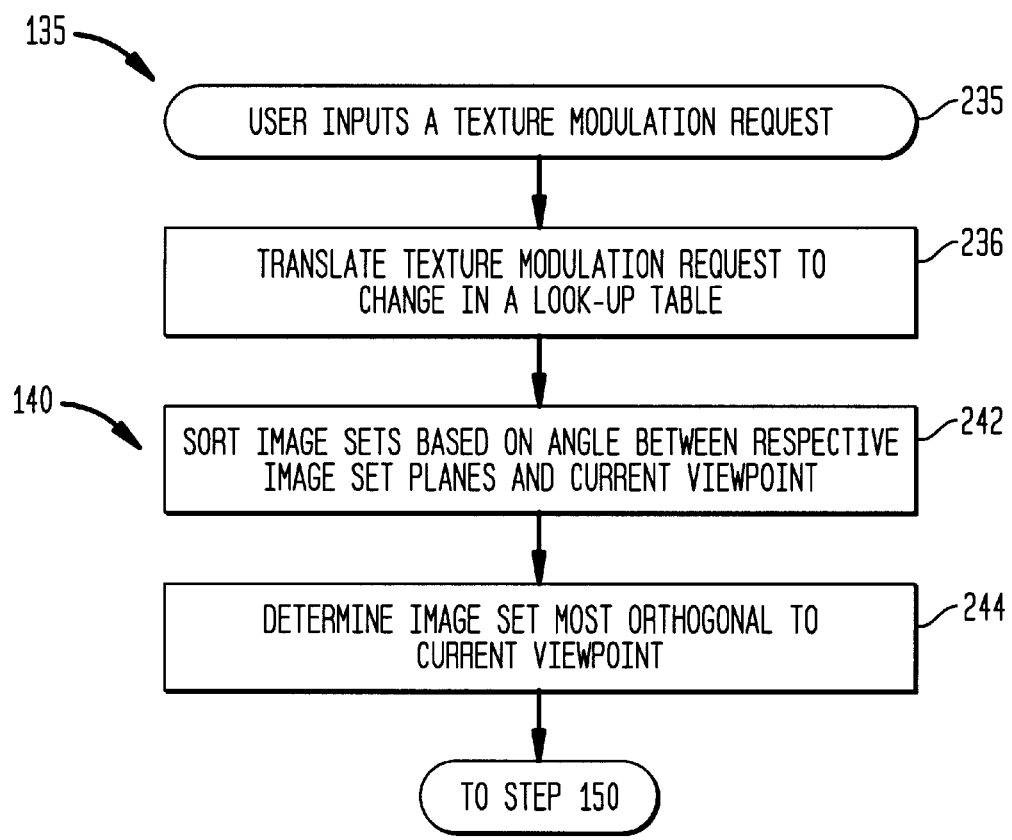

As shown in FIG. 2C, when a user inputs a texture modulation request 135, this texture modulation request is translated to a change in a lookup table (step 236). In this way, the input texture modulation request is calculated quickly as only look-up table entries have to be changed to represent input modulation request 135.

The selection of an image set in step 140 can be based upon a predetermined (unsorted) order or a sorted order. As shown in FIG. 2C, image sets can be sorted based on an angle between the respective image set planes and a current viewpoint (step 242). The image set which is selected first is determined to be the most orthogonal to a current viewpoint (step 244). In other words, the image set having a surface normal (also called the cardinal axis) most closely parallel with a line of sight. For example, the x-y image set 310 would be selected for current viewpoints closest to a surface normal from the x-y plane (that is, points closest to the z axis). The y-z image set 330 would be selected first for current viewpoints points closest to the x axis. The x-z image set 320 would be selected first for current viewpoints closest to the y axis. In this way, the first image set which is to be texture-modulated will be the image set that is likely to provide the most helpful and informative display view (with the most relevant foreground or front surface information).

Figure 2D:
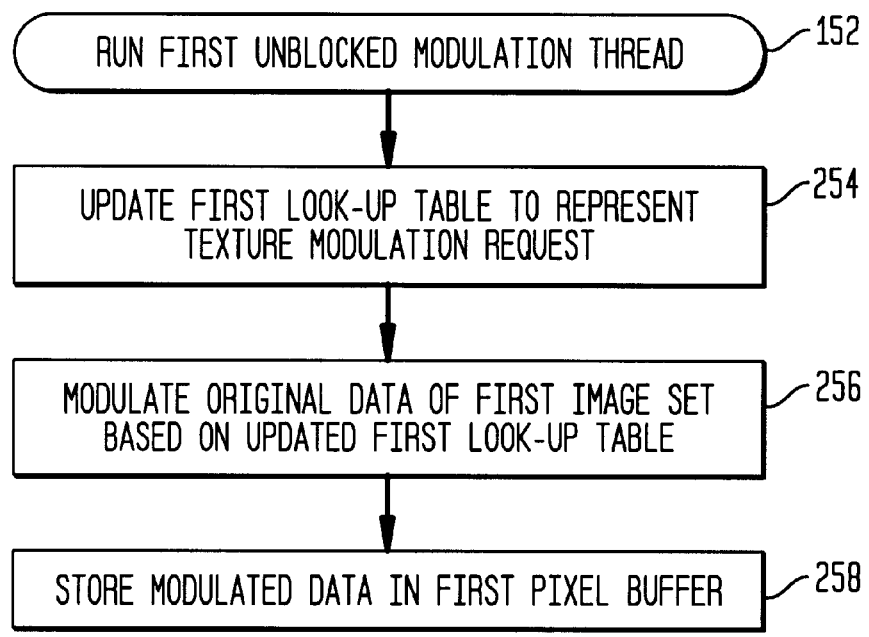
Figure 2E:
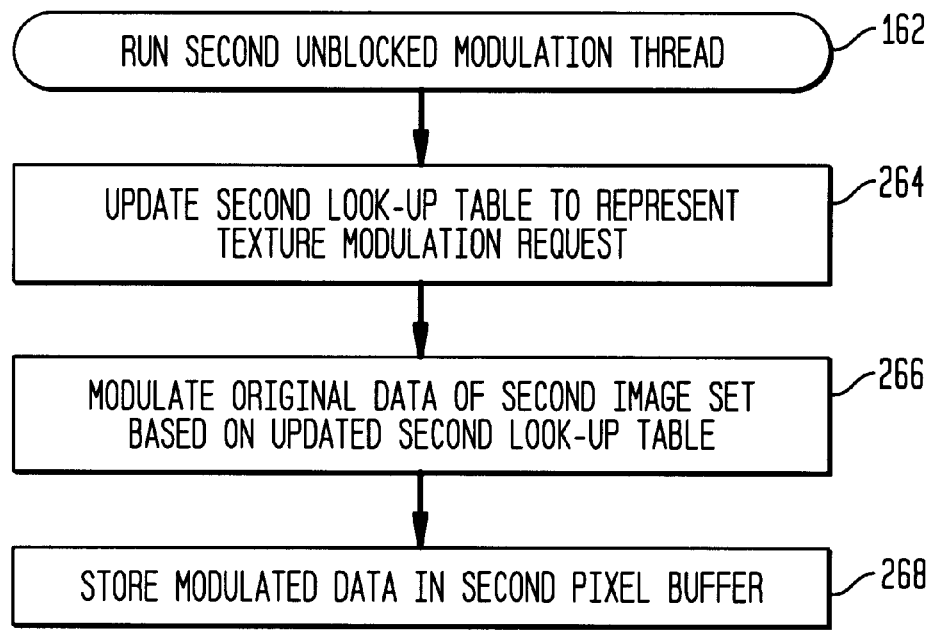
Figure 2F:
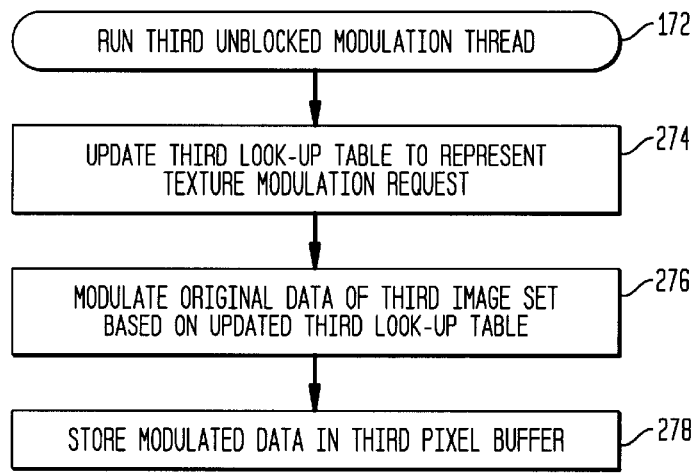

FIGS. 2D, 2E, and 2F illustrate the steps of running the first, second and third unblocked (or started) modulation threads 152, 162, and 172, respectively. As shown in FIG. 2D, when an image set is selected, a first modulation thread corresponding to the selected image set is run. For example, consider that the sorted order of image sets output in step 140 is x-y image set 310, x-z image set 320, and y-z image set 330. In step 152, then, first modulation thread $t_1$ is unblocked and run. In step 254, lookup table 410 is updated to represent input texture modulation request 135. In step 256, original data of x-y image set 310 is modulated in accordance with the updated lookup table 410. As step 256 proceeds, modulated results (also called intermediate results) are stored in the pixel buffer 412 (step 258). The modulated results in pixel buffer 412 can be displayed by main rendering thread $t_r$ at any time, that is, as the first texture modulation thread $t_1$ progresses and/or when the thread $t_1$ completes.

Figure 7:
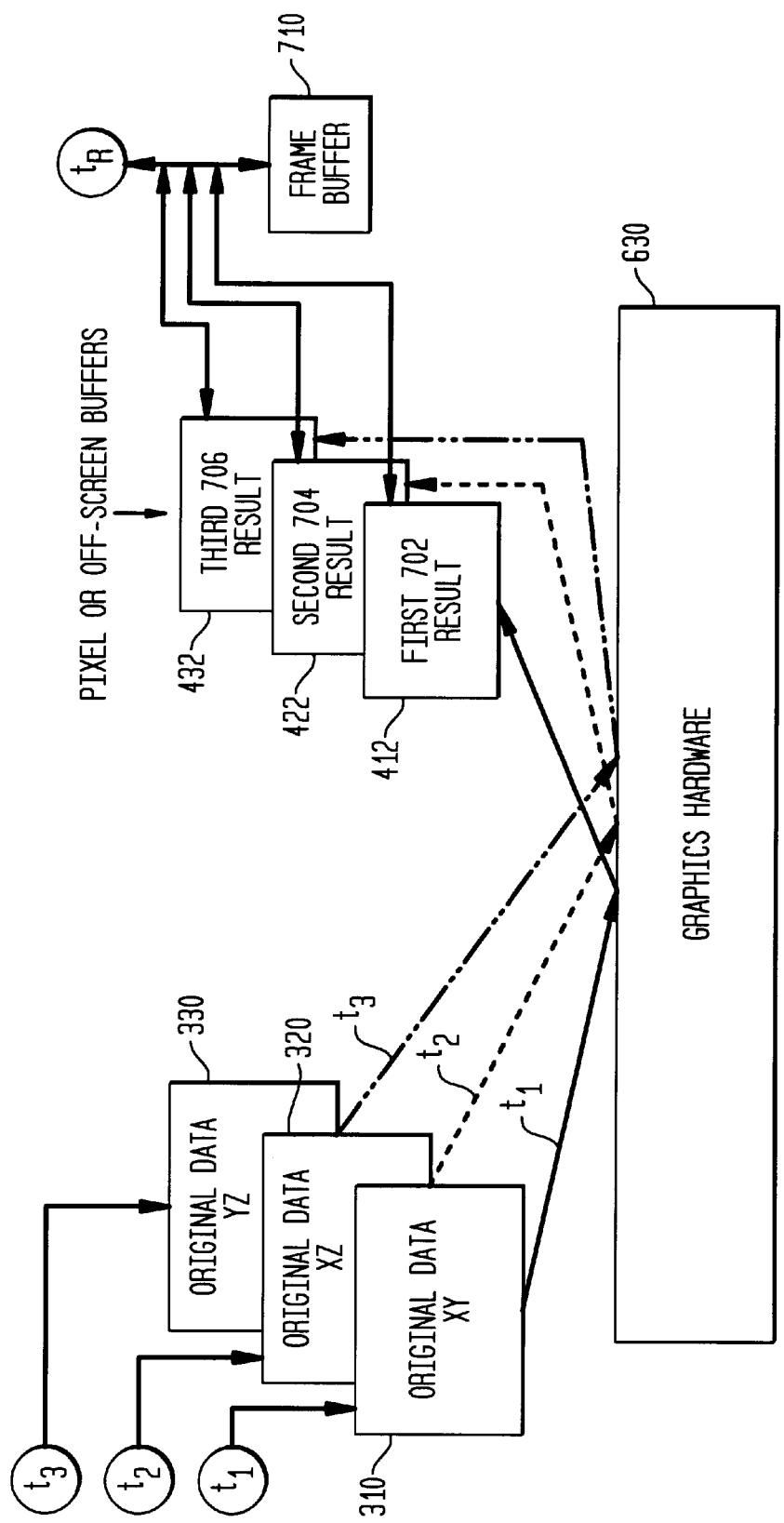
FIG. 7 is a diagram showing the processing of data during the execution of the main rendering thread and texture modulation threads according to an example of the present invention.

An example architecture is shown in FIG. 7. Graphics hardware 630 modulates original data x-y 310 in pixel buffer 412 and generates a first result 702. The first result 702 is then rendered (e.g., texture mapped) by graphics hardware 630 and stored in frame buffer 710 for display.

As shown in FIG. 2E, second modulation thread $t_2$ is unblocked and run (step 162). Look-up table 420 is updated to represent texture modulation request 135 (step 264). Original data of x-z image set 320 is modulated in accordance with the updated look-up table 420 to obtain a second result 704 (step 266) which is stored in pixel buffer 422 (step 268). Graphics hardware 630 then operates on (e.g., texture maps) second result 704 to store an image representative of a second intermediate texture modulated volume data view in frame buffer 710.

As shown in FIG. 2F, when unblocked or started, the third texture modulation thread $t_3$ is run (step 172). Look-up table 430 is updated to represent the input texture modulation request 135 (step 274). Original data of y-z image set 330 is modulated in accordance with the updated look-up table 430 to obtain third result 706 (step 276) which is stored in pixel buffer 432 (step 278).

Figure 8:
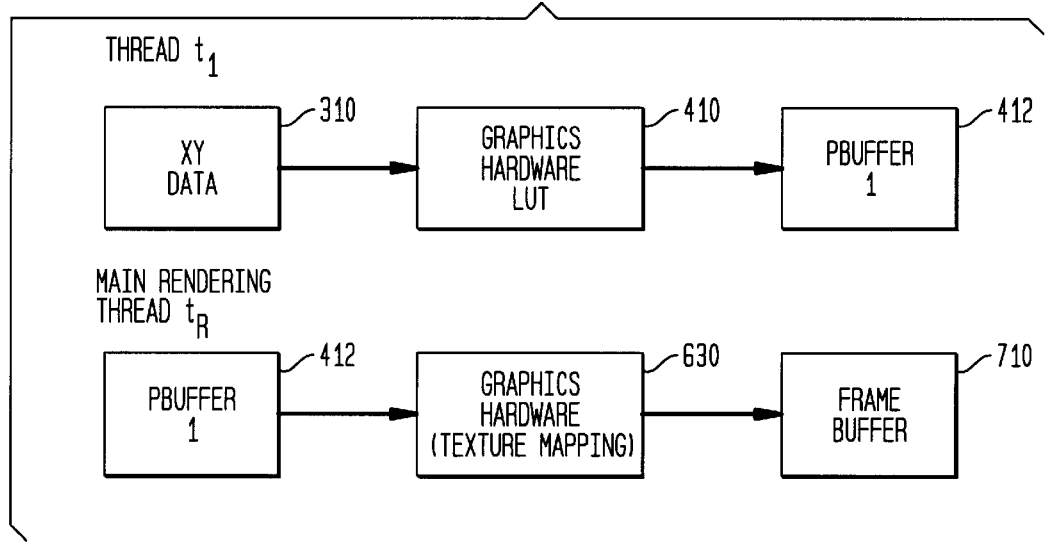
FIG. 8 is a diagram of the transfer of data in the execution of an example texture modulation thread and the main rendering thread.

As shown in FIG. 8, graphics hardware 630 modulates original data in x-y image set 310 based on look-up table 410 to generate first result 702. First result 702 is the modulated data stored in pixel buffer 412. Graphics hardware 630 also texture maps imagery to polygonal samples through the volume. In this case, graphics hardware 630 texture maps first result 702 from pixel buffer 412 to polygonal samples and pixel values which are stored in frame buffer 710 for subsequent display.

Example Implementation

The present invention can be implemented in software, firmware, and/or hardware. Preferably, routine 100 is implemented primarily as software, i.e., a computer program code executing on a processor. One or more of the steps (or a portion of the functionality of a step) in routine 100 can be implemented and accelerated using hardware, if available.

Given the description herein, it would be readily apparent to one skilled in the art to implement the present invention in any computer graphics application, application programming interface (API), platform, or system including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). Any computer graphics architecture can be used including, but not limited to, an Open GL™ graphics API architecture (including but not limited to Infinite Reality, Indigo$^2$, Indy, Octane, Onyx, or O$_2$ graphics workstations manufactured by Silicon Graphics, Inc.) and raster graphics architectures such as those described in Foley et al., *Computer Graphics,* Addison-Wesley Publishers, U.S.A. (1996), chapter 18, pp. 855–922 (incorporated herein by reference). Calculations can be performed in fixed-point or floating point arithmetic.

Using multi-threaded texture modulation on low-end machines without 3D texture mapping capabilities in hardware (e.g., O2), and indeed using the 3D texture mapping extension to OpenGL™ yields up to a three-fold speed up. In general, all graphics machines and, all current SGI machines including Onyx2, octane, and O2 can benefit greatly from the present invention with the most dramatic improvement being on lower cost systems.

Of course, these specific computer graphics systems are recited as examples which can support the present invention, but do not necessarily have to have the present invention to operate. For example, an Open GL™ graphics API architecture does not require use of the present invention. In other words, an Open GL™ graphics API architecture can provide volume rendering or other computation without using the advantages of the present invention as described herein.

Description in these terms is provided for convenience only. It is not intended that the invention be limited to application in this example environment. In fact, after reading the following description, it will become apparent to a person skilled in the relevant art how to implement the invention in alternative environments.

Example Computer System

Figure 9:
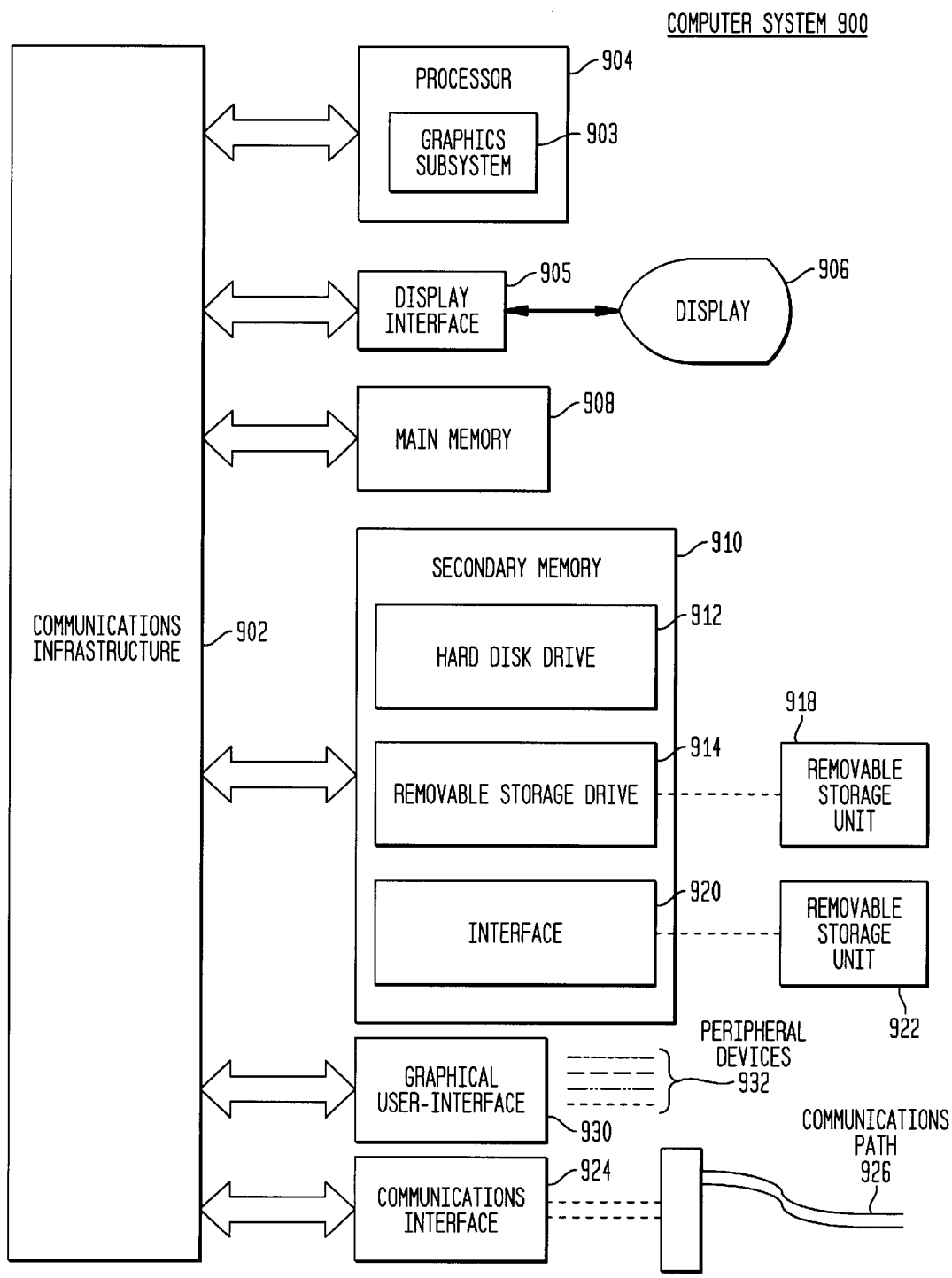
FIG. 9 is a diagram of an example computer system for implementing the routine 100 according to one example of the present invention.

An example of a computer system 900 is shown in FIG. 9. The computer system 900 represents any single or multi-processor computer. Single-threaded and multi-threaded computers can be used. Unified or distributed memory systems can be used.

The computer system 900 includes one or more processors, such as processor 904. One or more processors 904 can execute software implementing routine 100 as described above. Each processor 904 is connected to a communication infrastructure 902 (e.g., a communications bus, cross-over bar, or network). Various software embodiments are described in terms of this exemplary computer system. After reading this description, it will become apparent to a person skilled in the relevant art how to implement the invention using other computer systems and/or computer architectures.

Computer system 900 can include a graphics subsystem 903. Graphics subsystem 903 can be implemented as one or more processor chips. The graphics subsystem 903 can be included as part of processor 904 as shown in FIG. 9 or as a separate graphics engine or processor. Graphics data is output from the graphics subsystem 903 to the communication infrastructure 902. Display interface 905 forwards graphics data from the communication infrastructure 902 (or from a frame buffer not shown) for display on the display unit 906.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Graphical user interface module 930 transfers user inputs from peripheral devices 932 to communication infrastructure 902. These peripheral devices 932 can be a mouse, keyboard, touch screen, microphone, joystick, stylus, light pen, voice recognition unit, or any other type of peripheral unit.

The present invention is preferably implemented using software running (that is, executing) in an environment similar to that described above with respect to FIG. 9. In this document, the term "computer program product" is used to generally refer to removable storage unit 918, a hard disk installed in hard disk drive 912, or a carrier wave carrying software over a communication path 926 (wireless link or cable) to communication interface 924. Thus, a computer useable medium can include magnetic media, optical media, or other recordable media, or media that transmits a carrier wave. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software the software may be stored in a computer program product and loaded into computer system 900 using removable storage drive 914, hard drive 912, or communications interface 924. Alternatively, the computer program product may be downloaded to computer system 900 over communications path 926. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for volume rendering volumetric data to represent a texture modulation request, wherein three sets of the volumetric data are provided, each set corresponding to a different respective view, the method comprising the steps of:

executing a main rendering thread;

executing a first texture modulation thread to modulate texture of at least a portion of a first set of the volumetric data in accordance with the texture modulation request; and initiating each texture modulation thread including opening a respective display connection and context for each texture modulation thread, each texture modulation thread initiating step respectively including the steps of:

creating a respective pixel buffer and look-up table; and storing a respective set of volumetric data in the respective pixel buffer; and associating a pixel buffer with a texture object in a context of the main rendering thread.

2. The method of claim 1, further comprising the step of rendering an intermediate display view that includes each texture modulated portion of the first set of volumetric data.

3. The method of claim 1, further comprising the step of: returning control from the first texture modulation thread to the main rendering thread while the first texture modulation thread is executing; whereby a user can interact with a display view while the first texture modulation thread is executing.

4. The method of claim 1, further comprising the step of executing a second texture modulation thread to modulate texture of the second set of the volumetric data in accordance with the texture modulation request.

5. The method of claim 4, further comprising the step of executing a third texture modulation thread to modulate texture of the third set of the volumetric data in accordance with the texture modulation request.

6. The method of claim 1, wherein each texture modulation thread executing step includes a step of updating the respective look-up table to represent the texture modulation request.

7. A method for volume rendering volumetric data to represent a texture modulation request, wherein three sets of the volumetric data are provided, each set corresponding to a different respective view, the method comprising the steps of:
   executing a main rendering thread;
   executing a first texture modulation thread to modulate texture of at least a portion
   of a first set of the volumetric data in accordance with the texture modulation request;
   initiating each texture modulation thread including opening a respective display connection and context for each texture modulation thread;
   blocking each initiated texture modulation thread; and
   unblocking the initiated texture modulation threads prior to executing the texture modulation threads.

8. A method for volume rendering volumetric data to represent a texture modulation request, wherein three sets of the volumetric data are provided, each set corresponding to a different respective view, the method comprising the steps of:
   executing a main rendering thread;
   executing a first texture modulation thread to modulate texture of at least a portion
   of a first set of the volumetric data in accordance with the texture modulation request;
   initiating each texture modulation thread including opening a respective display connection and context for each texture modulation thread;
   blocking each initiated texture modulation thread;
   sorting the sets of volumetric data based on the angle between normals to the sets and a current viewpoint; and
   unblocking the initiated texture modulation threads and executing the texture modulation threads in a sequence based on the sorted order of the sets.

9. A method for volume rendering volumetric data to represent a texture modulation request, wherein three sets of the volumetric data are provided, each set corresponding to a different respective view, the method comprising the steps of:
   executing a main rendering thread;
   executing a first texture modulation thread to modulate texture of at least a portion
   of a first set of the volumetric data in accordance with the texture modulation
   request, wherein said first texture modulation thread executing step comprises the steps of:
     updating a first look-up table in accordance with the texture modulation request;
     modulating the first set of volumetric data in accordance with the updated look-up table; and
     storing the modulated data in a first pixel buffer, whereby at any time during or after execution of the first texture modulation thread the contents of the first pixel buffer can be mapped to a frame buffer so that the main rendering thread can output a display view representative of the contents of the first pixel buffer.

10. A system for volume rendering volumetric data to represent a texture modulation request, wherein three sets of the volumetric data are provided, each set corresponding to a different respective view, the system comprising:
    means for executing a main rendering thread;
    means for executing a first texture modulation thread to modulate texture of at least a portion of a first set of the volumetric data in accordance with the texture modulation request; and
    means for initiating each texture modulation thread including opening a respective display connection and context for each texture modulation thread, each of said texture modulation thread initiating means further including, respectively:
      means for creating a respective pixel buffer and look-up table; and
      means for storing a respective image set in the respective pixel buffer; and
      means for associating a pixel buffer with a texture object in a context of the main rendering thread.

11. The system of claim 10, further comprising:
    means for rendering an intermediate display view that includes each texture modulated portion of the first set of volumetric data.

12. The system of claim 10, further comprising:
    means for returning control from the first texture modulation thread to the main rendering thread while the first texture modulation thread is executing; whereby a user can interact with a display view while the first texture modulation thread is executing.

13. The system of claim 10, wherein each texture modulation thread executing means includes a means for modulating the respective look-up table to represent the texture modulation request.

14. A system for volume rendering volumetric data to represent a texture modulation request, wherein three sets of the volumetric data are provided, each set corresponding to a different respective view, the system comprising:
    means for executing a main rendering thread;
    means for executing a first texture modulation thread to modulate texture of at least a portion of a first set of the volumetric data in accordance with the texture modulation request;
    means for initiating each texture modulation thread including opening a respective display connection and context for each texture modulation thread;
    means for blocking each initiated texture modulation thread; and
    means for unblocking the initiated texture modulation thread prior to executing the texture modulation threads.

15. A system for volume rendering volumetric data to represent a texture modulation request, wherein three sets of the volumetric data are provided, each set corresponding to a different respective view, the system comprising:

means for executing a main rendering thread;

means for executing a first texture modulation thread to modulate texture of at least a portion of a first set of the volumetric data in accordance with the texture modulation request;

means for initiating each texture modulation thread including opening a respective display connection and context for each texture modulation thread;

means for blocking each initiated texture modulation thread;

means for sorting the sets of volumetric data based on the angle between normals to the sets and a current viewpoint; and means for unblocking the initiated texture modulation threads and executing the texture modulation threads in a sequence based on the sorted order of the sets.

16. A system for volume rendering volumetric data to represent a texture modulation request, wherein three sets of the volumetric data are provided, each set corresponding to a different respective view, the system comprising:

means for executing a main rendering thread;

means for executing a first texture modulation thread to modulate texture of at least a portion of a first set of the volumetric data in accordance with the texture modulation request, wherein said first texture modulation thread executing means comprises:

means for updating a first look-up table in accordance with the texture modulation request;

means for modulating the first set of volumetric data in accordance with the updated look-up table; and means for storing the modulated data in a first pixel buffer; whereby at any time during or after execution of the first texture modulation thread the contents of the first pixel buffer can be mapped to a frame buffer so that the main rendering thread can output a display view representative of the contents of the first pixel buffer.

* * * * *